C. H. GORDON.
HITCHING CHAIN.
APPLICATION FILED JAN. 21, 1910.
986,973.
Patented Mar. 14, 1911.
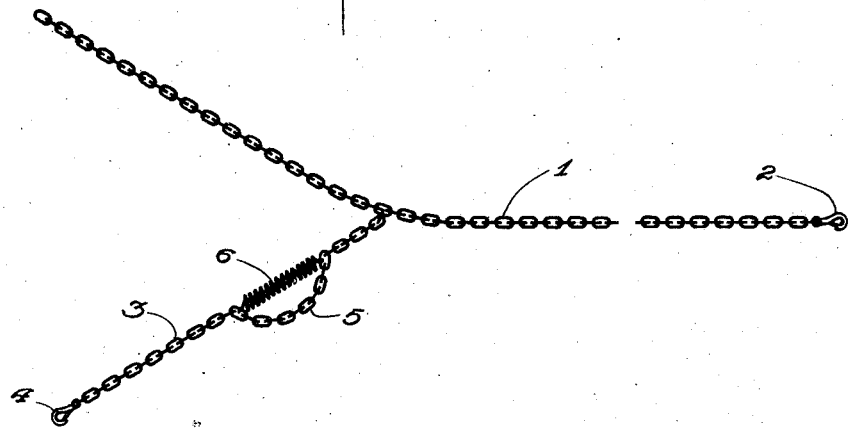
Fig. I
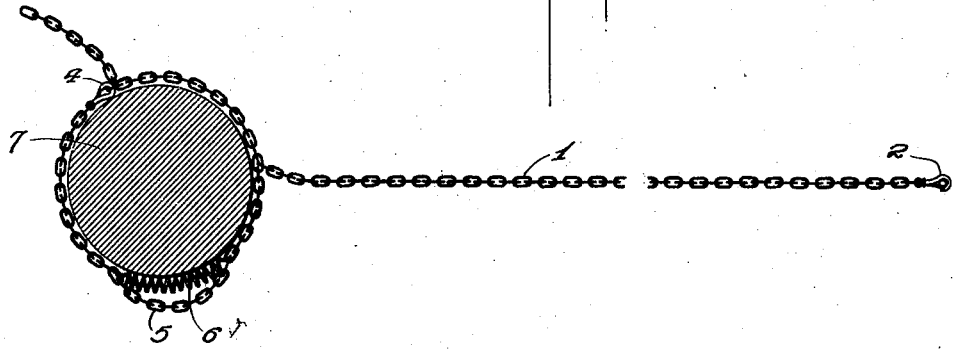
Fig. II
Witnesses
Frank H. Carter
H. P. Schroeder
Inventor
Charles H. Gordon
By E. E. Thomson,
Attorney

UNITED STATES PATENT OFFICE.

CHARLES H. GORDON, OF SAN JOSE, CALIFORNIA.

HITCHING-CHAIN.

986,973.   Specification of Letters Patent.   Patented Mar. 14, 1911.

Application filed January 21, 1910. Serial No. 539,241.

*To all whom it may concern:*

Be it known that I, CHARLES H. GORDON, citizen of the United States, residing at San Jose, in the county of Santa Clara and State of California, have invented certain new and useful Improvements in Hitching-Chains, of which the following is a specification.

This invention relates to the subject of tethering animals, and the principal object of the same is to provide a hitching cable that may be fastened about a hitching post or the like which will automatically tighten about said post, yet will at the same time permit of the necessary yielding movements to prevent injury being done to an animal hitched such as might occur through throwing of the head of the animal.

In carrying out the objects of the invention generally stated above it will be understood, of course, that the essential features thereof are necessarily susceptible of changes in details and structural arrangements, one preferred and practical embodiment of which is shown in the accompanying drawings, wherein:—

Figure I is a diagrammatic view of the improved hitching cable. Fig. II is a transverse sectional view of the hitching post showing the improved cable attached thereto.

Referring to said drawings by numerals, it will be observed that the improved hitching cable has been shown as formed of chains, although it will be understood that the same may be formed of rope or any other suitable or convenient material. The said hitching device comprises primarily a single length of chain 1, which is of a suitable length for hitching purposes, one end thereof being provided with a snap hook 2 or other convenient or suitable means that may be readily engaged with or disengaged from an animal's bridle, halter or like head gear. At a suitable point of the length of chain 1 and preferably adjacent the end thereof opposite the end which is equipped with the snap hook 2, an auxiliary chain 3 has one end linked to said chain 1 to permit of the necessary flexible connection, said auxiliary chain having its free end equipped with a snap 4 or other convenient fastening means. Intermediate its ends said auxiliary chain 3 has a portion of its length looped as indicated at 5, the ends of said loop portion 5 being connected by the spiral spring 6 that exerts a tension to draw the ends of said loop 5 toward each other when the hitching device is placed around the post.

In using the improved hitching device, the free end of chain 1 and the similar end of auxiliary chain 3 are wound about a post 7 and drawn tight thereon against the tension of spring 6 after which the snap hook 4 is engaged with one of the links of chain 1, as is shown more clearly in Fig. 2, the tightening of chains 1 and 3 obviously expanding spring 6 so that when said chains 1 and 3 are fastened together, the tension of spring 6 will be constantly exerted to tighten said chains about said post, so that the same will be prevented from slipping up or down on said post.

In addition to the manifest advantages of providing the spring which automatically tightens the chains about the post so that slippage of the same thereon is prevented, it will also be understood that said spring permits the necessary yielding to the main chain 1 so that in the event of a sudden strain being imparted to chain 1 through tossing of the head of the animal the danger of damage being done to the animal will be eliminated.

What I claim as my invention is:—

A hitching device comprising a main chain, a hook at one end of said chain, an auxiliary chain linked at one end to the links of the main chain intermediate its length, said auxiliary chain and a portion of said main chain forming a continuous length of chain when placed around a post, a spring secured between two of the links of said auxiliary chain and adapted to shorten said chain, and a hook at the free end of said auxiliary chain.

In testimony whereof I affix my signature in presence of two witnesses.

CHARLES H. GORDON.

Witnesses:
  MARIE SCHMID,
  ELSIE M. FULLER.

---

Copies of this patent may be obtained for five cents each, by addressing the "Commissioner of Patents, Washington, D. C."